(12) United States Patent
Hou et al.

(10) Patent No.: US 10,849,033 B2
(45) Date of Patent: *Nov. 24, 2020

(54) WIRELESS COMMUNICATION DEVICE AND WIRELESS COMMUNICATION METHOD

(71) Applicant: Sony Corporation, Tokyo (JP)

(72) Inventors: Yanzhao Hou, Beijing (CN); Qimei Cui, Beijing (CN); Shiyu Zhang, Beijing (CN); Shiwei Cao, Beijing (CN); Hui Liang, Beijing (CN); Qinyan Jiang, Beijing (CN); Xin Guo, Beijing (CN); Chen Sun, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,993

(22) Filed: Jan. 23, 2020

(65) Prior Publication Data

US 2020/0162974 A1  May 21, 2020

Related U.S. Application Data

(63) Continuation of application No. 15/770,405, filed as application No. PCT/CN2016/103995 on Oct. 31, 2016, now Pat. No. 10,582,429.

(30) Foreign Application Priority Data

Nov. 5, 2015 (CN) .......................... 2015 1 0746905

(51) Int. Cl.
*H04W 36/00* (2009.01)
*H04W 36/32* (2009.01)
(Continued)

(52) U.S. Cl.
CPC ....... *H04W 36/0083* (2013.01); *H04W 24/10* (2013.01); *H04W 36/0088* (2013.01); *H04W 36/30* (2013.01); *H04W 36/32* (2013.01)

(58) Field of Classification Search
CPC ............. H04W 52/0254; H04W 4/027; H04W 52/0232; H04W 72/0406; H04W 76/10;
(Continued)

(56) References Cited

U.S. PATENT DOCUMENTS

2010/0322185 A1   12/2010  Park et al.
2011/0117954 A1*   5/2011  Iwamura ........... H04W 36/0094
                                                              455/525

(Continued)

FOREIGN PATENT DOCUMENTS

CN     102859905 A    1/2013
CN     102938911 A    2/2013

(Continued)

OTHER PUBLICATIONS

Extended Search Report issued in European Application 16861519.3-1214 /3373635 dated Oct. 10, 2018.
(Continued)

*Primary Examiner* — Nizar N Sivji
(74) *Attorney, Agent, or Firm* — Xsensus LLP

(57) ABSTRACT

A wireless communication device and a wireless communication method. A wireless communication device for use in a user equipment side includes one or more processors. The processor is configured to: obtain information about movement of the wireless communication device relative to a serving base station thereof; adjust a triggering condition for sending a measurement report for use in cell handover based on the information; and control sending of the measurement report according to the adjusted triggering condition.

20 Claims, 12 Drawing Sheets

(51) Int. Cl.
 *H04W 24/10* (2009.01)
 *H04W 36/30* (2009.01)

(58) Field of Classification Search
 CPC . H04W 36/32; H04W 36/0083; H04W 36/30; H04W 36/0061; H04W 64/006; H04W 84/005; H04W 36/0016; H04W 48/04; H04B 17/318; H04B 7/0632; H04J 11/0069
 See application file for complete search history.

(56) References Cited

U.S. PATENT DOCUMENTS

| | | |
|---|---|---|
| 2011/0263262 A1 | 10/2011 | Min et al. |
| 2013/0023302 A1 | 1/2013 | Sivanesan et al. |
| 2013/0260764 A1 | 10/2013 | Gil et al. |
| 2014/0099959 A1 | 4/2014 | Min et al. |
| 2014/0171086 A1* | 6/2014 | Nakamori ......... H04W 36/0088 455/436 |
| 2015/0195758 A1 | 7/2015 | Kim et al. |
| 2015/0215831 A1* | 7/2015 | Jung ................. H04W 36/0083 370/332 |
| 2015/0304928 A1 | 10/2015 | Lu et al. |
| 2016/0142962 A1 | 5/2016 | Min et al. |
| 2016/0242109 A1* | 8/2016 | Kwak .................. H04W 48/16 |
| 2017/0339594 A1 | 11/2017 | Park et al. |

FOREIGN PATENT DOCUMENTS

| | | |
|---|---|---|
| EP | 2 744 274 A1 | 6/2014 |
| WO | WO 2010/105416 A1 | 9/2010 |
| WO | 2013/027993 A2 | 2/2013 |
| WO | 2014/081354 A1 | 5/2014 |

OTHER PUBLICATIONS

NTT DoCoMo, et al., "Speed Dependent Scaling of Mobility Control Parameters", 3GPP TSG RAN WG2 #60, Tdoc-R2-075149, 7 Pages total, (Nov. 5-9, 2007).

International Search Report dated Jan. 24, 2017, in PCT/CN2016/103995 filed Oct. 31, 2018.

\* cited by examiner

WIRELESS COMMUNICATION DEVICE AND WIRELESS COMMUNICATION METHOD

CROSS-REFERENCE TO RELATED APPLICATIONS

The present application is a continuation of U.S. application Ser. No. 15/770,405, filed Apr. 23, 2018, which is based on PCT filing PCT/CN2016/103995, filed Oct. 31, 2016, which claims priority to CN 201510746905.8, filed Nov. 5, 2015, the entire contents of each are incorporated herein by reference.

TECHNICAL FIELD

The present disclosure generally relates to the field of wireless communication, and in particular to wireless communication apparatus and wireless communication method.

BACKGROUND

In a wireless communication system, when a mobile station moves from a cell (referring to a base station or a coverage of the base station) to another cell, it is necessary to perform channel switching in order to maintain uninterrupted communication of a mobile user. How to successfully and rapidly complete cell handover is one of important aspects of cellular cell system design in the wireless communication system.

Proximity-based service (ProSe) direct communication, such as device-to-device (D2D) communication, in a cellular network generally refers to a service in which user data can be transmitted directly between terminals without relaying transmission data via the network. In particular, as a typical scenario of Internet of Things applications, D2D communication may include vehicle to vehicle (V2V) communication and the like. The communication resources used by apparatus for the proximity-based service direct communication are allocated by a base station of a current serving cell, so the issue of cell handover should also be considered in the proximity-based service direct communication.

SUMMARY

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, a wireless communication apparatus for user equipment side is provided. The wireless communication apparatus includes at least one processor configured to: acquire information regarding a movement of the wireless communication apparatus with respect to a serving base station thereof; adjust, based on the information, a trigger condition for a transmission of a measurement report for performing a cell handover; and control, based on the adjusted trigger condition, a transmission of the measurement report.

According to another embodiment, a wireless communication method for user equipment side is provided. The wireless communication method includes: acquiring information regarding movement of a wireless communication apparatus with respect to a serving base station thereof; adjusting, based on the information, a trigger condition for a measurement report for performing a cell handover; and controlling, based on the adjusted trigger condition, a transmission of the measurement report.

According to yet another embodiment, a wireless communication apparatus for base station side is provided. The wireless communication apparatus includes at least one processor configured to: acquire a measurement report which is transmitted by a user equipment in a case where a trigger condition is met, where the trigger condition is related to a movement of the user equipment with respect to the base station; determine, based on the measurement report, whether to perform a cell handover; and generate a handover command for the user equipment in a case where it is determined to perform the cell handover.

According to still another embodiment, a wireless communication method for base station side is provided. The wireless communication method includes: acquiring a measurement report which is transmitted by a user equipment in a case where a trigger condition is met, where the trigger condition is related to a movement of the user equipment with respect to the base station; determining, based on the measurement report, whether to perform a cell handover; and generating a handover command for the user equipment in a case where it is determined to perform the cell handover.

With the embodiments of the present disclosure, it is helpful to improve efficiency and/or accuracy of a cell handover process.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF THE EMBODIMENTS

Figure 1:
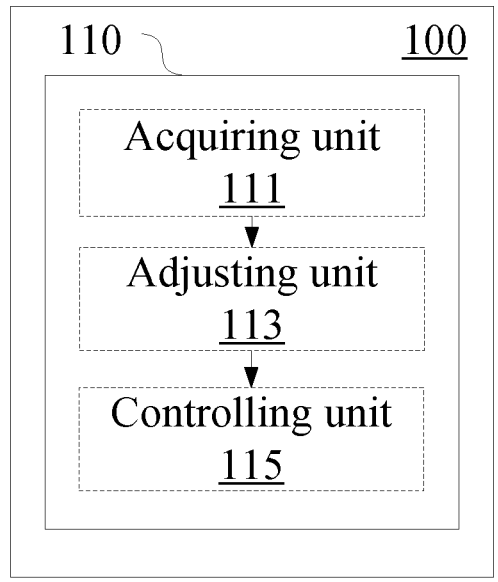
FIG. 1 is a block diagram showing a configuration example of a wireless communication apparatus for user equipment side according to an embodiment of the present disclosure.

Hereinafter embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clearness.

As shown in FIG. 1, a wireless communication apparatus 100 according to an embodiment includes a processor 110. The processor 110 includes an acquiring unit 111, an adjusting unit 113, and a controlling unit 115. It should be noted that, although the acquiring unit 111, the adjusting unit 113 and the controlling unit 115 are shown as functional blocks in the drawing, it should be understood that functions of the acquiring unit 111, the adjusting unit 113 and the controlling unit 115 may be implemented by the processor 110 as a whole, and are not necessarily implemented by discrete actual components in the processor 110. In addition, although the processor 110 is shown by one block, the communication apparatus 100 may include multiple processors. The functions of the acquiring unit 111, the adjusting unit 113 and the controlling unit 115 may be distributed onto multiple processors, and thus the multiple processors cooperate to perform the functions.

According to an embodiment, the acquiring unit 111 is configured to acquire information regarding a movement of the wireless communication apparatus 100 with respect to a serving base station thereof. The adjusting unit 113 is configured to adjust, based on the information acquired by the acquiring unit 111, a trigger condition for a transmission of a measurement report for performing a cell handover. The controlling unit 115 is configured to control the transmission of the measurement report based on the trigger condition adjusted by the adjusting unit 113.

Next, corresponding processing performed by the acquiring unit 111, the adjusting unit 113 and the controlling unit 115 are described with reference to specific embodiments.

The acquiring unit 111 may acquire the information regarding the movement of the wireless communication apparatus 100 with respect to the base station in various ways. In an embodiment, the acquiring unit 111 is configured to: acquire position information of the serving base station and position information of the wireless communication apparatus 100, and determine the information regarding the movement of the wireless communication apparatus 100 with respect to the serving base station based on the acquired position information of the serving base station and the wireless communication apparatus 100.

The acquiring unit 111 may acquire the position information of the base station based on a signaling from the base station. The acquiring unit may acquire the position information of the wireless communication apparatus 100, for example, through a Global Positioning System (GPS) device of the wireless communication apparatus 100. The movement state of the wireless communication apparatus 100 with respect to the base station may be determined based on the above position information. An example manner of acquiring the information regarding movement by the acquiring unit 111 will be further described later in conjunction with specific embodiments.

In addition, according to an embodiment, the trigger condition for the transmission of the measurement report for performing the cell handover to be adjusted by the adjusting unit 113 may include a length of a time-to-trigger for triggering the transmission of the measurement report.

Figure 14:
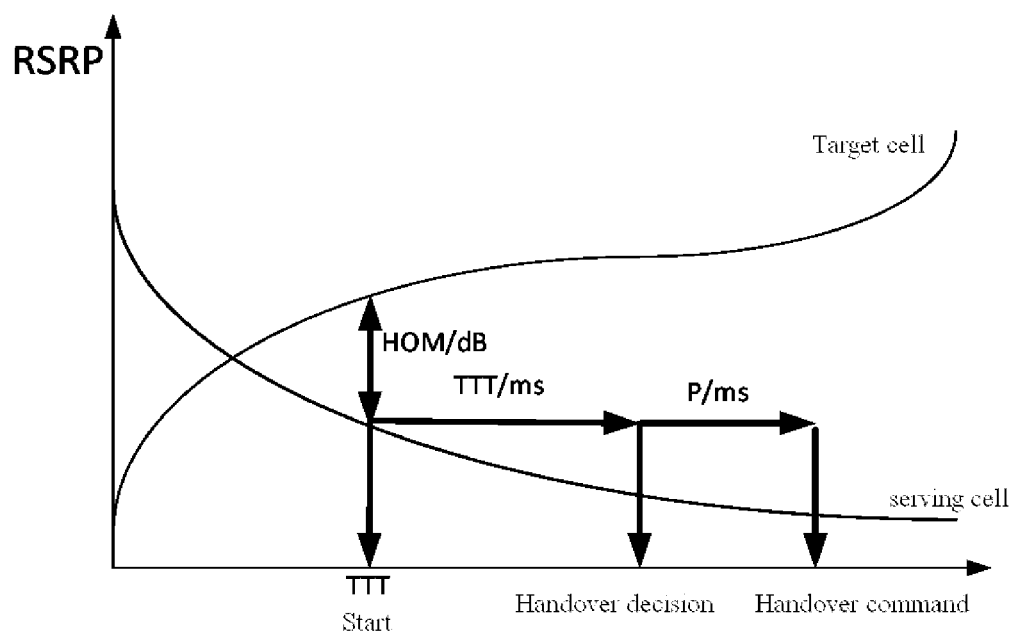
FIG. 14 is a schematic diagram showing a cell handover condition.

Next, the measurement report for performing the cell handover and the trigger condition for transmitting the measurement report will be briefly described with reference to FIG. 14.

The corresponding standard for measurement and judgment of handover defined in the LTE (Long Term Evolution) standard involve the following aspects.

Reference Signal Received Power (RSRP) is one of key parameters that can represent a wireless signal strength in an LTE network and one of physical layer measurement requirements. RSRP is average power of signals received on all resource elements (REs) carrying the reference signal within a symbol.

Handover Margin (HOM) is a difference between the RSRP of a current serving cell and the RSRP of a neighboring cell. The value of HOM may be set according to different communication environments, and a duration of handover delay depends on the value of HOM.

Time to Trigger (TTT) indicates a time period in which a certain HOM condition must be continuously met in order to perform a handover judgment. TTT can effectively avoid "ping-pong effect" during the handover.

A user equipment (UE) monitors the RSRPs of all monitored cells and transmits the measurement report to the eNB of the serving cell when RSRPs continuously meet the condition shown in the following Equation (1) within a given TTT.

$$RSRP_T - RSRP_S \geq HOM \text{ continuously for } TTT(/ms) \quad \text{Equation (1)}$$

where the UE may set the TTT parameter based on a movement speed thereof (for example, see content related to SpeedStateScaleFactors in TS36.331 of the 3GPP (Third Generation Partnership Project)). $RSRP_T$ is the reference signal received power of a target cell, and $RSRP_S$ is the reference signal received power of the serving cell.

After receiving the measurement report, the current serving eNB starts preparing to hand over the UE to a new target cell (assuming that the target cell always has enough resources for the UE to be handed over). The time for preparation can be modeled as a constant protocol delay, denoted as P in FIG. 14. After the preparation is completed, the serving cell transmits a handover command message to the UE.

According to a specific embodiment, the information regarding a movement of the wireless communication apparatus 100 with respect to the serving base station acquired by the acquiring unit 111 may include an angle between a movement direction of the wireless communication apparatus 100 and a radial direction of the wireless communication apparatus 100 with respect to the serving base station. The radial direction of the wireless communication apparatus 100 with respect to the serving base station refers to a direction of a half-line starting from the position of the serving base station and passing through the wireless communication apparatus 100 (for example, the direction indicated by $\overrightarrow{EV}$ in FIG. 15).

More specifically, the acquiring unit 111 may be configured to acquire the information regarding movement by determining the radial direction based on the position information of the serving base station and the position information of the wireless communication apparatus 100. The position information of the serving base station may be acquired based on a measurement control signaling from the serving base station. Alternatively, the position information of the serving base station may be acquired based on a system information block from the serving base station.

Next, a specific example of the above embodiment will be described with reference to FIG. 15.

Figure 15:
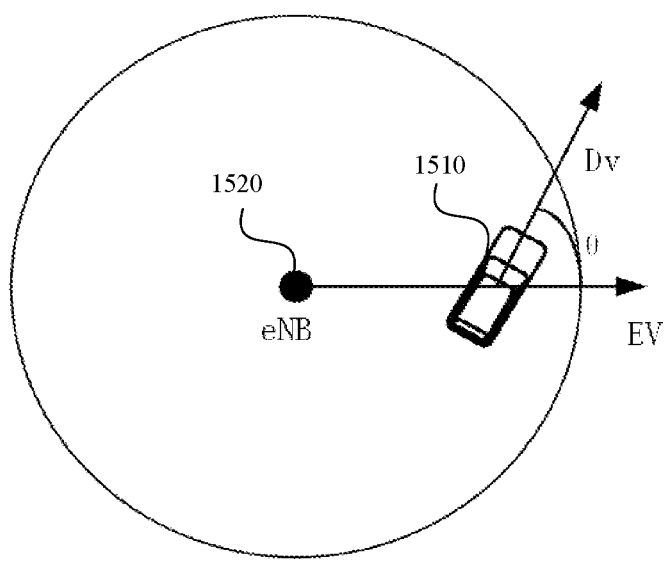
FIG. 15 is a schematic diagram showing a movement of a vehicle with respect to a base station of a serving cell.

In the example shown in FIG. 15, a traveling direction of a vehicle 1510 as an example of the user equipment is $\overrightarrow{D_v}$, the radial direction of the vehicle 1510 with respect to a cell of a serving base station 1520 thereof (that is, the radius direction of a circle centered at the base station 1520 and passes through the vehicle 1510) is $\overrightarrow{EV}$. The angle between $\overrightarrow{D_v}$ and $\overrightarrow{EV}$ is θ.

For example, the angle may be calculated according to Equation (2) below.

$$\theta = \cos^{-1} \frac{\overrightarrow{EV} \cdot \overrightarrow{D_v}}{|\overrightarrow{EV}| \cdot |\overrightarrow{D_v}|} \quad \text{Equation (2)}$$

The radial direction $\overrightarrow{EV}$ of the vehicle 1510 with respect to the cell of the serving base station 1520 may be, for example, calculated according to the following Equation (3).

$$\overrightarrow{EV} = (v_1, v_2) - (e_1, e_2) \quad \text{Equation (3)}$$

where $(v_1, v_2)$ is the coordinate of the vehicle 1510 and $(e_1, e_2)$ is the coordinate of the eNB. The coordinate $(v_1, v_2)$ of the vehicle is acquired, for example, by the GPS device of the vehicle, and the coordinate $(e_1, e_2)$ of the base station is obtained, for example, through a signaling from the base station.

As an example, the coordinate $(e_1, e_2)$ of the eNB may be embedded into (measurement control measConfig in) a message (RRCConnectionReconfiguration) for reconfiguring radio resource control (RRC) transmitted by the eNB. An example of the format of a measurement control signaling is shown in the following Table 1.

TABLE 1

| Format of the Measurement Control Signaling | |
|---|---|
| coordinate of the eNB | measurement control |

In addition, the coordinate $(e_1, e_2)$ of the eNB may also be contained in a system information block, such as MIB or SIB1.

In the above example, the vehicle is taken as an example of the user equipment. Here, the V2V communication scenario which is one of the application scenarios of the embodiment of the present disclosure is briefly described. Communication resources used by vehicles in the V2V communication are allocated by the eNB of a current serving cell. When the vehicle travels to a neighboring cell, the communication resource is not authorized by the eNB of the cell, which may cause interference to other users in the cell. Therefore, the handover problem also needs to be considered in the V2V communication. In the V2V communication scenario shown in FIG. 13, many vehicles on a road perform V2V communication within a coverage of a cellular network. In view of the high-speed mobility of the vehicle, the vehicle can easily move from the current cell to the neighboring cell, and thus cell handovers occur frequently. In addition, as compared with traditional cellular communication and other D2D communication, a V2V communication (especially when it involves road safety information) has higher requirements on communication delay and information detection rate. Therefore, the solution of the embodiment of the present disclosure, which helps to improve the efficiency and/or accuracy of the cell handover process, is particularly meaningful to the V2V application scenario. However, it should be understood that the embodiments of the present disclosure are also applicable to wireless communication scenarios other than V2V, such as V2X.

Continuing to refer to FIG. 1, a configuration example of the wireless communication apparatus 100 according to an embodiment of the present disclosure will be described. According to an embodiment, the adjusting unit 113 may be configured to adjust the trigger condition for a transmission of the measurement report as follows. The time-to-trigger is shortened in a case where the information regarding movement of the wireless communication apparatus 100 with respect to the serving base station indicates that the wireless communication apparatus 100 moves away from the serving base station. In the embodiment of the present disclosure, the time-to-trigger is adjusted based on the time-to-trigger set in a conventional or existing manner, that is, the adjustment may be adjusting the time-to-trigger already set in the conventional or existing manner.

More specifically, in a case where the acquiring unit 111 acquires the angle between the movement direction of the wireless communication apparatus 100 and the radial direction of the wireless communication apparatus 100 with respect to a cell of the serving base station as the information regarding movement of the wireless communication apparatus 100, the adjustment on the trigger condition by the adjusting unit 113 may include: shortening the time-to-trigger for triggering the transmission of the measurement report with decrement of an absolute value of the angle, in a case where the absolute value of the angle is less than a predetermined threshold, where the predetermined threshold being greater than 0° and less than or equal to 90°.

In addition, according to an embodiment, the adjusting unit 113 may be configured to make the time-to-trigger be not less than a predetermined lower limit value. The predetermined lower limit value may be determined based on conditions such as an actual application scenario and a system configuration, and the predetermined lower limit value reflects a maximum tolerable limit for occurrence of the ping-pong effect.

Next, an example manner in which the adjusting unit 113 adjusts the trigger condition for the transmission of the measurement report is described. It should be understood that the embodiment of the present disclosure is not limited to the specific details in the following examples.

According to an example embodiment, the time-to-trigger TTT for the transmission of the measurement report may be adjusted according to the following Equation (4).

$$TTT_f = \min(TTT \times (\alpha + \sin\theta), TTT) \quad \text{Equation (4)}$$

$TTT_f$ is the adjusted value of TTT, $\theta \in [0,90°]$, and $\alpha$ is a constant greater than 0 and less than 1 to ensure that $TTT_f$ is greater than zero.

Figure 16:
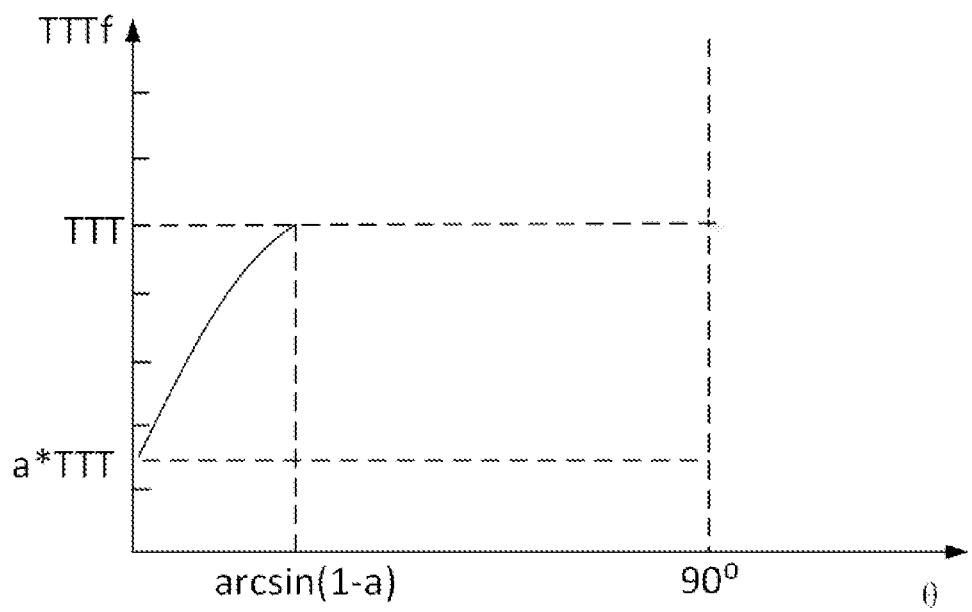
FIG. 16 is a schematic diagram showing adjustment of the cell handover condition.

As shown in FIG. 16, $TTT_f$ is a piecewise function, the value of $\alpha$ determines a lower bound of $TTT_f$ which is $\alpha \times TTT$, and an upper bound of $TTT_f$ is TTT.

In a case where $\theta \in (0, \sin^{-1}(1-\alpha))$, $TTT_f$ is a strictly monotonically increasing function of $\theta$. In a case of $\theta \in (\sin^{-1}(1-\alpha), 90°)$, $TTT_f$ is TTT.

For example, in a case where $\alpha$ equals to $$1 - \frac{\sqrt{2}}{2},$$

the minimum value of $TTT_f$ is $$\left(1 - \frac{\sqrt{2}}{2}\right) * TTT.$$

In a case of $\theta=45°$, $TTT_f$ reaches the maximum value which is TTT.

In another example, the $TTT_f$ may be determined according to the following Equation (5).

$$TTT_f = \alpha \times TTT + (1-\alpha) \times \sin\theta \times TTT, \theta \in [0,90°] \quad \text{Equation (5)}$$

In this example, $TTT_f$ ranges from $\alpha \times TTT$ to TTT, and $TTT_f$ is a strictly monotonically increasing function of $\theta$ in the range $\theta \in [0,90°]$.

An embodiment in which the movement direction is used as the information regarding movement is described above. However, in other embodiments, the trigger condition may also be adjusted based on other information regarding movement. For example, according to an embodiment, the adjusting unit 113 may be further configured to adjust the time-to-trigger based on a movement velocity of the wireless communication apparatus 100.

For example, the TTT may be adjusted according to a function generally expressed by the following Equation (6).

$$TTT_f = f(sf, \theta, \alpha, TTT), \theta \in [0,90°] \quad \text{Equation (6)}$$

where $sf$ is a speed factor used to indicate whether the movement velocity of the wireless communication apparatus 100 is high speed, medium speed or low speed. $f$ function is an increasing function of $\theta$, and a range of $f$ function is $[\alpha \times sf \times TTT, sf \times TTT]$. $\theta$ may be considered as a factor that determines how fast the vehicle leaves the cell of the serving base station thereof.

The parameter $\alpha$ in Equation (6) may be included in measConfig cell delivered by the eNB. In a case where a certain accuracy of judgment is met (for example, the accuracy is greater than 80%, which may be defined according to the specific system requirements), in order to make full use of the directional information, $\alpha$ may be set as small as possible, which is beneficial for the vehicle to reduce the TTT and realize fast handover. However, a too small $\alpha$ may result in a too small TTT and result in more frequent cell reselections. A person skilled in the art can understand that the parameters such as $\alpha$ and a specific form of the function f may be appropriately set according to specific applications.

With the above embodiments of the present disclosure, the time-to-trigger for the report of the measurement report may be effectively shortened by using the information regarding movement of a user equipment, such as the position and the traveling direction of a vehicle.

In addition, with regard to the movement direction, as previously described, the movement direction of the wireless communication apparatus 100 may include a real-time movement direction of the wireless communication apparatus, an average movement direction of the wireless communication apparatus during a previous predetermined time period, or an estimated average movement direction of the wireless communication apparatus during a subsequent predetermined time period. More specifically, in the V2V scenario, the movement direction of the vehicle may include, for example:

a real-time movement direction of the vehicle, which may include the instantaneous traveling direction of the vehicle at the moment of entering into an A3 event (the traveling direction is relatively stable due to a fixed extension direction of the road in the traffic scenario);

a historical statistical direction of the vehicle in a time period, such as an average traveling direction of the vehicle during a time period before entering the A3 event (the average traveling direction in the time period may refer to a direction of a vector from the position of the vehicle at an initial moment of the time period to the position of the vehicle at a final moment of the time period); or an average traveling direction of the vehicle during a subsequent time period indicated by a navigational route in an automatic drive scenario, for example.

An example embodiment in which the adjusting unit 113 adjusts the trigger condition is described above. Correspondingly, the controlling unit 115 may control the transmission of the measurement report based on the trigger condition adjusted by the adjusting unit 113 as follows. The measurement report is transmitted in a case where a difference between a reference signal received power of the serving base station and a reference signal received power of a target base station for performing the cell handover is continuously greater than a predetermined threshold during the adjusted time-to-trigger.

Besides, in addition to adjusting the time-to-trigger based on the information regarding movement, the entry of the trigger event for the measurement report may also be controlled based on the information regarding movement.

According to an embodiment, the controlling unit 115 may be configured to control to enter into and/or exit from the trigger event for the measurement report for performing the cell handover based on the information regarding movement of the wireless communication apparatus 100 with respect to the serving base station.

For example, controlling to enter into and/or exit from the trigger event based on the information for movement may include: making an entry condition of entering into the trigger event at least include that the wireless communication apparatus moves away from the serving base station; and/or exiting from the trigger event in a case where the wireless communication apparatus moves towards the serving base station. In addition, the entry condition may further include that a difference between a reference signal received power of the serving base station and a reference signal received power of a target base station for performing the cell handover is greater than a predetermined threshold.

Still referring to FIG. 15, according to a particular embodiment, the controlling unit 115 may control to enter into and exit from the trigger event (such as the A3 event) according to the following conditions.

It is controlled to enter into the A3 event when the following condition is met, $$RSRP_T - RSRP_S \geq HOM \text{ and } \theta < 90°,$$

it is controlled to exit from the A3 event when the following condition is met, $$RSRP_T - RSRP_S \leq HOM \text{ or } \theta > 90°,$$

where $RSRP_T$ is the reference signal received power of the target cell and $RSRP_S$ is the reference signal received power of the serving cell.

Figure 2:
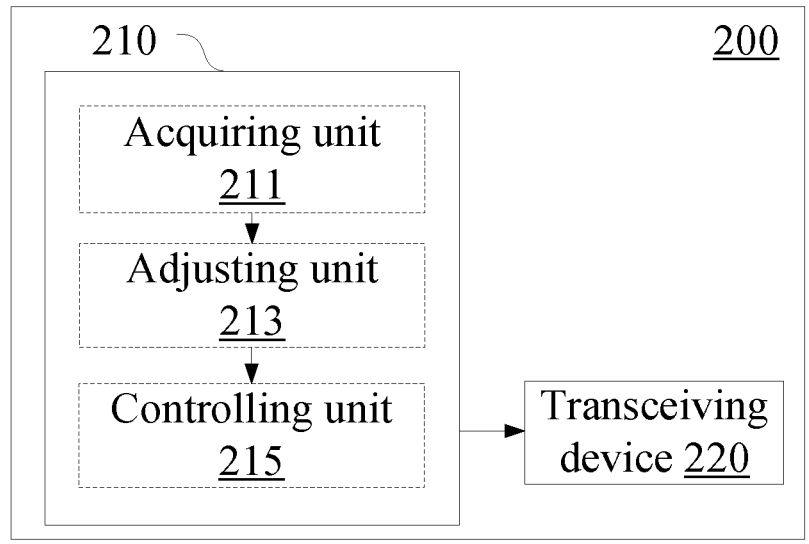
FIG. 2 is a block diagram showing a configuration example of a wireless communication apparatus for user equipment side according to another embodiment.

Next, a wireless communication apparatus according to another embodiment of the present disclosure will be described with reference to FIG. 2. As shown in FIG. 2, the wireless communication apparatus 200 includes a processor 210 and a transceiving device 220. The processor 210 includes an acquiring unit 211, an adjusting unit 213 and a controlling unit 215, the configurations of which are similar to the acquiring unit 111, the adjusting unit 113 and the controlling unit 115 described with reference to FIG. 1 respectively, and a detailed description thereof is omitted herein.

The transceiving device 220 is configured to transmit the measurement report for performing cell handover to another wireless communication apparatus in proximity-based service direct communication with the wireless communication apparatus 200.

The wireless communication apparatus according to the present embodiment can be applied to a scenario in which joint handover is performed on the wireless communication apparatuses in proximity-based service direct communication with each other.

More specifically, still taking the V2V application scenario as an example, since the close-range characteristic and the consistent traveling actions of two communication parties in the V2V communication, the eNB may regard the two communication parties as a whole to judge whether it is necessary to perform cell handover. The wireless communication apparatus 200 according to the present embodiment may provide its measurement report to another wireless communication apparatus, and the another wireless communication apparatus provides the measurement reports of the wireless communication apparatus 200 together with the another wireless communication apparatus to the serving base station, and the base station performs a joint judgment for the cell handover of these two communication apparatuses.

Accordingly, according to an embodiment, the transceiving device 220 may also be configured to receive, from one or more other wireless communication apparatuses in proximity-based service direct communication with the wireless communication apparatus 200, measurement reports for performing the cell handover. In this embodiment, the wireless communication apparatus 200 may receive the measurement reports from other wireless communication apparatuses and provides the measurement reports of other wireless communication apparatuses together with the measurement report of the wireless communication apparatus 200 to the serving base station, and the base station performs a joint judgment for the cell handover of these communication apparatuses.

More specifically, the transceiving device 220 may be configured to transmit the measurement reports received from another wireless communication apparatus during a predetermined time period together with the measurement report of the wireless communication apparatus 200 to the serving base station.

Next, an example of the joint judgment manner of the cell handover will be described in conjunction with the V2V application scenario.

Firstly, considering a case where traveling directions of two communication parties in the V2V communication are the same. The case where the traveling directions being the same refers to that two communication parties in the V2V communication travels along the same extending direction of the traveling road. Since the close-range characteristic and the consistent traveling actions of two communication parties in the V2V communication, the eNB may regard the receiving part and the transmitting party as a whole to judge whether it is necessary to perform cell handover.

Figure 17:
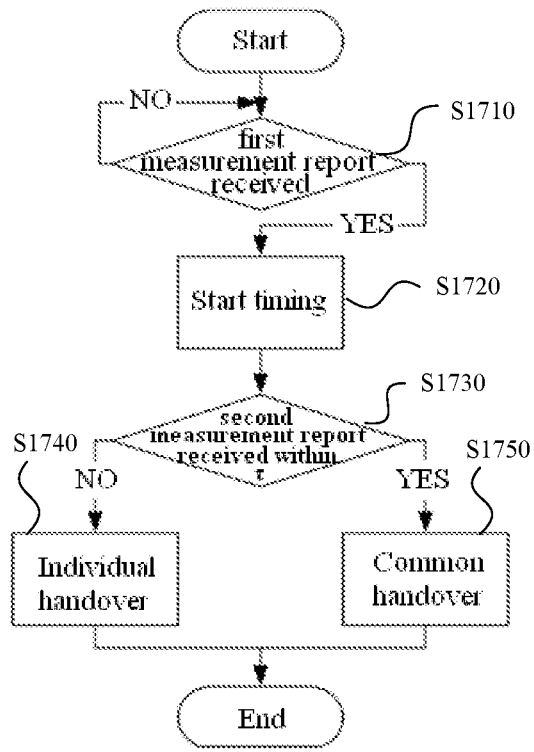
FIG. 17 is a flowchart showing an example of a process of determining a cell handover manner.

Referring to FIG. 17, in a case where the eNB receives a measurement report of one of two communication vehicles in the V2V communication (YES in S1710) and then, within a certain a time period τ (S1720), receives a measurement report of the other one of two communication vehicles in the V2V communication (YES in S1730), a common handover decision is made (S1750), thus the probability of wrong handover judgment is reduced. In a case that the second measurement report is not received in the time period τ (NO in S1730), the eNB individually hands over the vehicle that transmits the first measurement report (S1740).

In the above example, the eNB receives measurement reports from two communication parties in the V2V communication. However, it is also possible to uniformly transmit the measurement reports of two communication parties by one communication apparatus as in the above embodiment. In this case, the communication apparatus responsible for uniformly transmitting the measurement reports transmits two measurement reports to the eNB in a case where the communication apparatus receives the measurement report from the communication object in the V2V communication in a predetermined time period (corresponding to S1750 in FIG. 17), otherwise, the communication apparatus only transmit its own measurement report (corresponding to S1740 in FIG. 17).

In addition, in a case where the joint handover is performed on the wireless communication apparatuses in proximity-based service direct communication with each other, the trigger condition such as TTT and HOM may be further reduced while guaranteeing the accuracy of the handover judgment. Adjustment of the trigger condition may be determined based on a relative speed, a relative distance and the like between apparatuses. In other words, according to some embodiments, the adjustment of the trigger condition for the transmission of the measurement report depends not only on the movement of the apparatus with respect to the base station, but also on the relative movement between the apparatuses.

Accordingly, according to an embodiment, the acquiring unit 111 may further be configured to acquire information regarding a distance and/or a relative speed between the wireless communication apparatus 100 and another wireless communication apparatus in proximity-based service direct communication with the wireless communication apparatus 100. The adjusting unit 113 may further be configured to adjust the trigger condition for the transmission of the measurement report based on the distance and/or the relative speed between the wireless communication apparatus and the another wireless communication apparatus.

More specifically, the adjusting unit 113 may be configured to reduce a time-to-trigger and/or a handover margin for triggering the transmission of the measurement report with increment of the distance between the wireless communication apparatus 100 and the another wireless communication apparatus.

For example, the time-to-trigger TTT and the handover margin HOM for triggering the transmission of the measurement report may be adjusted according to the following Equations (7) and (8) respectively, $$TTT = \beta \cdot TTT \qquad \text{Equation (7)}$$

$$HOM = \beta \cdot HOM \qquad \text{Equation (8)}$$

where β is a constant greater than 0 and less than 1.

For example, β in Equations (7) and (8) may be related to the distance between a receiving vehicle and a transmitting vehicle. Taking a V2V application scenario as an example, in a V2V communication, generally, a transmitting vehicle periodically broadcasts V2V information. After receiving the V2V information, the receiving vehicle periodically transmits acknowledgment information (ACK). The acknowledgment information is required to include position information $V_R$ of the receiving vehicle. The transmitting vehicle calculates an inter-vehicle distance $$D = |\overrightarrow{V_T V_R}|$$

based on position information $V_T$ of the transmitting vehicle and the position information $V_R$ of the receiving vehicle in the acknowledgment information. A less inter-vehicle distance D corresponds to β closer to 1, and a greater inter-vehicle distance D corresponds to a less β. β may be regarded as a parameter for measuring a coupling degree between the transmitting vehicle and the receiving vehicle.

For example, it is set that $\beta = e^{-D/100}$.

β is close to 1 when the inter-vehicle distance D is close to 0. HOM and TTT are almost unchanged. A greater inter-vehicle distance D corresponds to a less β. However, the coverage of the V2V communication is about 100 meters, the value of β may not be too small. The value of β in the V2V information may be updated when the transmitting vehicle transmits the V2V information in the next period.

In the above example, the case where the movement directions of two communication vehicles in the V2V scenario are the same is considered. However, in a case where the traveling directions of two communication parties are opposite, the basis of the above joint judgment is in lack, and the transmitting vehicle and the receiving vehicle should be judged and handed over separately. The traveling directions being opposite refers to that two communication parties in the V2V communication travels along the opposite extending directions of the traveling road.

Figure 18:
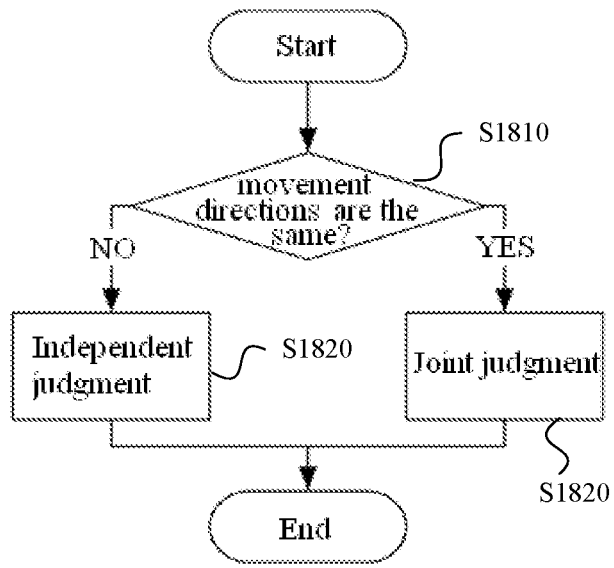
FIG. 18 is a flowchart showing an example of a judgment manner for a cell handover.

An example of determining a judgment manner of the cell handover based on movement directions of two parties in proximity-based service direct communication with each other is described with reference to FIG. 18.

In S1810, it is determined whether the movement directions of two parties in proximity-based service direct communication with each other are the same.

If the movement directions are different, an independent judgment manner is used for the cell handover (S1820).

If the movement directions are the same, a joint judgment manner is used for the cell handover (S1830).

The judgment manner may be selected at base station side based on traveling directions of a transmitting party and a receiving party. For example, resource configuration information for the proximity-based service direct communication delivered by the base station before the two parties start the communication indicates whether the independent judgment manner or the joint judgment manner is used for two communication parties. In addition, whether the traveling directions are different or same may be determined by, for example, a measurement by the base station.

In addition, in a case where the joint judgment manner is used for the cell handover, the user equipment may report the measurement report for the cell handover in the following manners, for example.

The user equipments performing the proximity-based service direct communication report the measurement reports to the base station separately.

The user equipments performing the proximity-based service direct communication transmit the measurement reports to one of the user equipments. The one user equipment gathers the measurement reports of other user equipments received in a predetermined time period and then reports the collected measurement reports together with the measurement report of the one user equipment to the base station. If no measurement report of another user equipment is received within a predetermined time period, the one user equipment reports only its own measurement report. The base station performs a handover judgment based on the received single measurement report or gathered measurement reports.

Alternatively, both the independent judgment manner and the joint judgment manner may be used. For example, the base station may configure at least two TTT values for the handover event, used for the independent judgment manner and the joint judgment manner, respectively. The UE may, for example, respectively report the measurement reports for the two TTT values and corresponding processes. The base station performs the handover judgment based on a first received measurement report. Similarly, in the embodiments of the present disclosure, for example, multiple TTTs (TTT for the independent judgment manner and TTT for the joint judgment manner) may be configured for the A3 event.

In the above embodiments of the present disclosure, the joint judgment manner is used for the handover condition for the user equipments in proximity-based service direct communication with each other, thereby the accuracy of the judgment and the speed of judgment can be improved.

An example of the joint judgment manner for the cell handover is described above. Next, an example of a cell handover manner according to an exemplary embodiment of the present disclosure is explained. In order to avoid signaling congestion caused by a large number of handover requests in a short period of time, and to reduce the signaling overhead, according to an embodiment of the present disclosure, the user equipments performing the proximity-based service direct communication with each other may perform the cell handover in groups.

For example, in a case where the cell handover is performed on two vehicles in V2V communication with each other, a target eNB may reserve two Cell Radio Network Temporary Identifiers (C-RNTIs), two random access preamble sequences. The source eNB delivers the reserved resources to one of the vehicles, which informs the reserved resources to the other vehicle, and a group handover process is performed.

Figure 19:
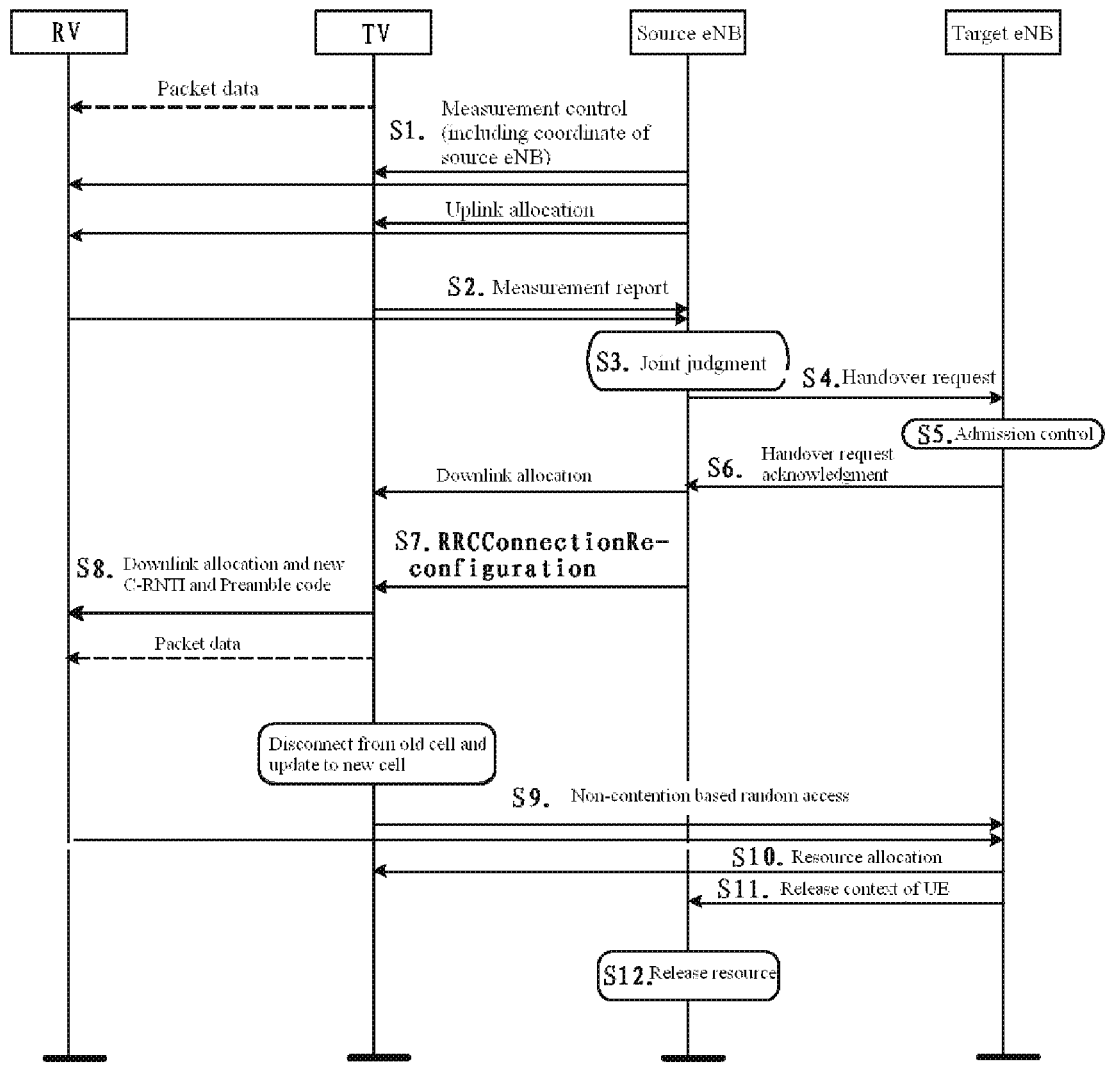
FIG. 19 is a flowchart showing an example of a process of a cell handover.

Next, an example of the group handover process is described with reference to FIG. 19. It should be understood that the embodiments of the present disclosure are not limited to the specific details in the following example.

In step S1, the source eNB notifies the vehicles TV and RV (TV and RV are the vehicles performing V2V communication) of a measurement configuration message by the measConfig cell carried in the RRCConnectionReconfigurtion message, that is, a measurement control is delivered, the message includes coordinate information of the source base station.

In step S2, TV and RV report the measurement reports to the eNB. The measurement report includes, for example, a 1-bit transmission and reception indication bit and a 1-bit priority indication bit.

In step S3, the source eNB performs the joint judgment.

In step S4, the source eNB transmits a handover request to the target eNB. The handover request contains the necessary information required by the target eNB for the handover, such as a target cell identify, C-RNTIs of the transmitting vehicle and the receiving vehicle in the source cell included in the RRC context.

If the target eNB is able to ensure communication resources, admission control is performed in step S5. The target eNB configures the required communication resources, reserves two C-RNTIs and two random access preamble sequences.

In step S6, the target eNB transmits a handover request acknowledgment message to the source eNB, the message includes an RRC container, specific content of which is a handover command for triggering the UE to perform handover. The handover command includes two new C-RNTIs, and also carries two random access dedicated Preamble codes, access parameters and system information or the like.

In step S7, the source eNB transmits an RRCConnection-Reconfigurtion message to the transmitting vehicle, the message includes the RRC container in the previous step and handover resource allocation information.

In step S8, TV informs RV of the handover resource allocation information, new C-RNTI and Preamble code, access parameters, system information, and the like.

After S8, TV and RV may employ resources allocated in a handover resource pool (as will be described later) to perform communication.

In step S9, TV and RV initiate a non-contention based random access to the target cell.

After accessing the target cell, in step S10, the target eNB allocates new resources to the transmitting vehicle.

In step S11, the target eNB notifies the source eNB of the successful handover, and notifies the source eNB that the resource in the handover resource pool may be released.

In step S12, the source eNB releases the handover resource and control plane related resources.

As mentioned above, the signaling overhead for the cell handover may be effectively reduced through the group handover.

It should be noted that, for the above handover resource pool, since handover interruption time period is about 30 ms, the life cycle of the resource of the resource pool may be set to be 50 ms, and the source eNB automatically releases the resource in the handover resource pool after the timing ends. If there is no idle handover resource to be allocated to non-safety related vehicle, the handover resource allocation information is not included in S7, but information of the new C-RNTI and Preamble or the like is still included. In S8, the transmitting vehicle informs the receiving vehicle of the new C-RNTI and Preamble code, access parameters, system information, and the like. Since there is no allocated handover resource, there is a handover interruption after the vehicle is disconnected form the source cell, however, the group handover can still be implemented.

The configuration of the handover resource pool will be described in more detail below.

LTE hard handover results in an interruption time period after the UE disconnects from the source base station and before the UE establishes a connection with the target base station. In order to ensure continuity of the proximity-based service direct communication during handover, according to an embodiment of the present disclosure, part of the time-frequency resources may be reserved to form the handover resource pool. Before the transmitting vehicle disconnects from the source base station, a time-frequency resource in the handover resource pool is allocated to the transmitting vehicle for terminal-to-terminal communication between vehicles until the vehicle establishes a connection with the target base station and is allocated with new resources.

The handover resource pool may be configured according to the following principles.

The source cell and the target cell share the same handover resource pool, and it is ensured that the use of the handover resource pool does not interfere with other users in the source cell and the target cell.

The source cell and the target cell know about the usage of the handover resource pool, to avoid a case where the same resource is repeatedly allocated.

The resources in the handover resource pool may be reused by UEs located in the center of the cell to improve a resource utilization rate.

In addition, in a V2V application scenario, for example, the handover resource pool may be divided into two parts due to the different traveling directions of the vehicles on both sides of the road:

One part includes handover resources used by the vehicle handing over from cell 1 to cell 2.

The other part includes handover resources used by the vehicle handing over from cell 2 to cell 1.

Traffic flows on both sides of the road tends to be different. Considering fairness, relative amounts of the two parts of time-frequency resources in the handover resource pool should be dynamically adjusted based on traffic flows on both sides of the road. For example, in a T time period, the number of vehicles handing over from cell 1 to cell 2 is n, and the number of vehicles handing over from cell 2 to cell 1 is m, and the total number of time-frequency resources in the handover resource pool is N+M. N is the number of handover resources for handover from cell 1 to cell 2 and M is the number of handover resources for handover from cell 2 to cell 1. The followings are met.

$$N = \lceil (N+M) \cdot \frac{n}{n+m} \rceil$$
$$M = (N+M) - \lceil (N+M) \cdot \frac{n}{n+m} \rceil$$

In addition, for example, resource pool configuration information may be updated every T time period.

In addition, due to the possibility that a large number of vehicles need to perform the handover and the scarcity of the time-frequency resources, the issue of resource competition may be taken into account when allocating the handover resources.

For example, the V2V communications may be classified as safety-related V2V communication and non-safety-related V2V communication, and a high priority and a low priority are given thereto, respectively.

Several dedicated time-frequency resources are further reserved in each of the two parts of the handover resource pool, for being allocated to safety-related vehicle for use when the remaining part of the resources are depleted. For the convenience of description, the dedicated time-frequency resources are called as a first part, the remaining part of the resources is called as a second part.

Accordingly, the following resource allocation manners may be used.

In a first manner, in a case where the second part has remaining resources, the first part of resources will not be allocated.

In a second manner, in a case where the second part has remaining resources, if multiple vehicles request for handover resources at the same time, the resources are allocated in the order of the high priority to the low priority.

In a third manner, in a case where the second part does not have remaining resources, a) if a vehicle with a high priority requests for the handover resources, the eNB allocates the first part of resources to the vehicle;

b) at this point, if a resource is released, the released resource should be immediately added to the first part to ensure the numbers of original idle time-frequency resources in the first part;

c) if a vehicle with a low priority requests for the handover resources, the handover resources will not be allocated to the vehicle, so handover interruption occurs.

The above example resource competition scheme is provided to ensure that the requirement of safety-related V2V communication vehicles is met in a case that the handover resources are not sufficient.

With the foregoing handover resource pool configuration, in the cell handover process, resources in the handover resource pool are allocated to the user equipment to ensure continuity of the communication of the user equipment, and the configuration of the resource pool is dynamically adjusted to ensure that the user with the high priority obtains preferentially the handover resources.

Next, an example of the joint judgment and a group handover for the cell handover in a broadcast scenario will be described. The same part of the cell handover of the user equipment in the broadcast scenario as that of the foregoing example in a unicast scenario are not described repeatedly, and the following differences are mainly described. In addition, the V2V application scenario is used as an example for description. However, it should be understood that the embodiments of the present disclosure are also applicable to other wireless communication scenarios.

With regard to division of the group, the joint judgment in the broadcast scenario requires the source base station to know information of the vehicles performing the V2V communication. Therefore, an identifier (such as C-RNTI) of the vehicle should be added to the V2V broadcast information transmitted by the vehicle. Once the receiving vehicle in the broadcast coverage area demodulates the broadcast information and acquires C-RNTI of the transmitting vehicle, the receiving vehicle immediately transmits a join request to the eNB.

A broadcast group information table may be established at the eNB end, as shown in Table 2 below, in which C-RNTI of the broadcasting vehicle and the receiving vehicle in the broadcast group is recorded.

TABLE 2

Broadcast group member information table

| Members | C-RNTI |
|---|---|
| Transmitting vehicle | C-RNTI |
| Receiving vehicle 1 | C-RNTI1 |
| Receiving vehicle 2 | C-RNTI2 |

When the receiving vehicle loses the signal of the broadcasting vehicle, the receiving vehicle transmits a request to the eNB to exit, and the eNB deletes the information of the vehicle in the broadcast group member information table, so that the eNB can know the information of the member in the broadcast group in a real time manner.

An example of the joint judgment is described as follows. It is assumed that there are 7 vehicles in the group, including 1 transmitting vehicle and 6 receiving vehicles. For example, when the eNB receives the measurement reports transmitted by the transmitting vehicle and more than half of the receiving vehicles, the eNB may make a handover decision without waiting until all the vehicles report the measurement reports, which can reduce the handover delay.

An example of the group handover is described as follows. After the source eNB makes the handover decision, the source eNB may transmit a handover request to the target eNB, the handover request includes the broadcast group information table. The target eNB transmits handover request acknowledgment information to the source eNB. The specific content of the RRC container may include a handover command for triggering the UE to perform handover. The handover command includes multiple old C-RNTIs and new C-RNTIs, and further carries a random access dedicated Preamble code, access parameters and system information or the like. The old C-RNTIs correspond to the new C-RNTIs and Preamble in a one to one manner. The source eNB transmits an RRCConnectionReconfigurtion message to the transmitting vehicle, the messages includes the RRC container in the previous step and the handover resource allocation information. The transmitting vehicle broadcasts the handover resource allocation information, new C-RNTIs and Preamble code, access parameters and system information or the like. The receiving vehicle acquires new C-RNTIs and Preamble according to the old C-RNTIs.

In the above description of the wireless communication apparatus according to the embodiment of the present disclosure, some processes and methods are disclosed apparently. Subsequently, a wireless communication method for user equipment side according to an embodiment of the present disclosure is described without repeating the details described above.

Figure 3:
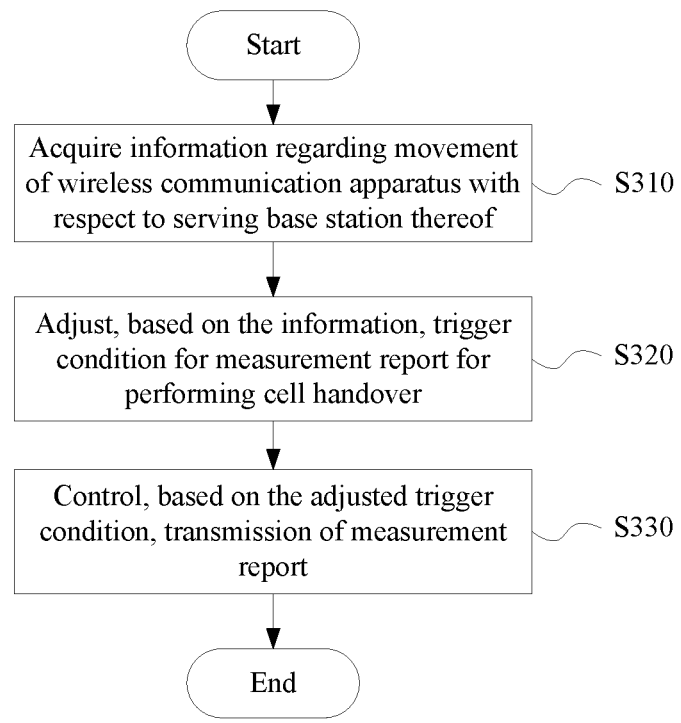
FIG. 3 is a flowchart showing a process example of a wireless communication method for user equipment side according to an embodiment of the present disclosure.

As shown in FIG. 3, a wireless communication method for user equipment side according to an embodiment of the present disclosure includes steps.

In step S310, information regarding movement of a wireless communication apparatus with respect to a serving base station thereof is acquired.

Next, in step S320, a trigger condition for a measurement report for performing a cell handover is adjusted based on the information.

Next, in step S330, a transmission of the measurement report is controlled based on the adjusted trigger condition.

The embodiments of the wireless communication apparatus and the wireless communication method for user equipment side are described above, a wireless communication apparatus and a wireless communication method for base station side are further provided according to the embodiments of the present disclosure.

Figure 4:
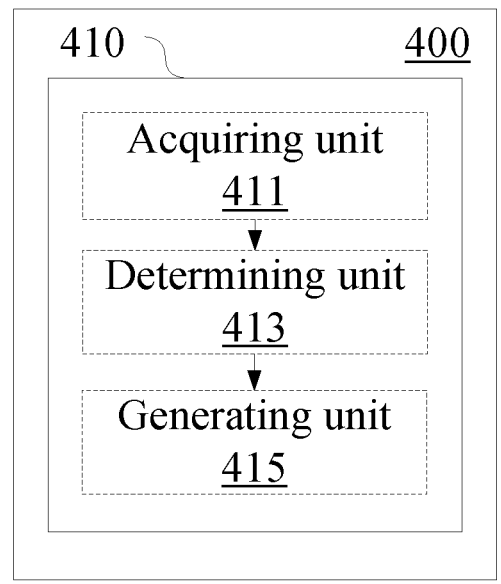
FIG. 4 is a block diagram showing a configuration example of a wireless communication apparatus for base station side according to an embodiment of the present disclosure.

As shown in FIG. 4, according to an embodiment of the present disclosure, a wireless communication device 400 for base station side includes one or more processors 410. The processor 410 includes an acquiring unit 411, a determining unit 413, and a generating unit 415.

The acquiring unit 411 is configured to acquire a measurement report which is transmitted by a user equipment in a case where a trigger condition is met, where the trigger condition is related to a movement of the user equipment with respect to the base station.

The determining unit 413 is configured to determine, based on the measurement report, whether to perform a cell handover for the user equipment.

The generating unit 415 is configured to generate a handover command for the user equipment in a case where it is determined to perform the cell handover.

For example, the trigger condition is adjusted by the user equipment based on the movement of the user equipment with respect to the base station. For example, the movement of the user equipment with respect to the base station is determined by the user equipment based on the position of the base station. Accordingly, according to an embodiment, the wireless communication apparatus for base station side is configured to transmit the position information of the base station to the user equipment.

Figure 5:
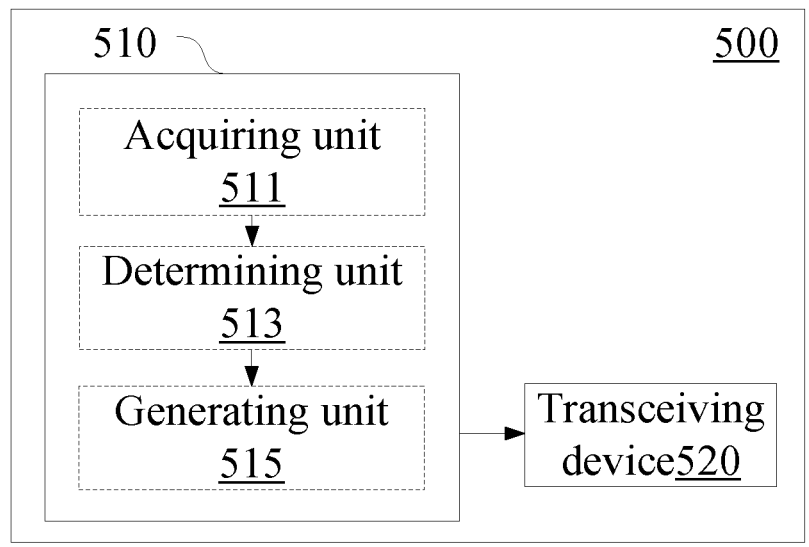
FIG. 5 is a block diagram showing a configuration example of a wireless communication apparatus for base station side according to another embodiment.

As shown in FIG. 5, a wireless communication apparatus 500 for base station side includes one or more processors 510 and a transceiving device 520. The processor 510 includes an acquiring unit 511, a determining unit 513 and a generating unit 515, the configurations of which are similar to the above-mentioned acquiring unit 411, the determining unit 413 and the generating unit 415, respectively.

The transceiving device 520 is configured to transmit position information of the base station to the user equipment.

According to an embodiment, the transceiving device 520 is configured to transmit the position information of the base station through a radio resource control signaling. For example, the transceiving device 520 may notify the user equipment of a measurement configuration message through the measConfig cell carried in the RRCConnectionReconfigurtion message, the measurement configuration message may include the position information of the base station.

In addition to embedding the position information of the base station in a measurement control signaling to be transmitted to the user equipment, the position information of the base station may also be embedded in a system information block (such as MIB or SIB1) to be transmitted to the user equipment.

The user equipment may adjust the trigger condition for the measurement report based on the information from the base station. The adjustment of the triggering condition may be related to an angle between a movement direction of the user equipment and a radial direction of the user equipment with respect to the base station. The radial direction may be determined based on the position information of the base station and the position information of the user equipment.

In addition, the wireless communication apparatus for base station side according to the embodiment of the present disclosure may perform group handover on user equipments.

The wireless communication apparatus according to an embodiment of the present disclosure may be configured to generate a common handover command for a first user equipment and a second user equipment in proximity-based service direct communication with the first user equipment, in a case where a measurement report from the second user equipment is received during a predetermined time period after a measurement report for the cell handover from the first user equipment is received. In this embodiment, the base station receives measurement reports from multiple user equipments.

In addition, the measurement reports of multiple user equipments may also be collected by one of the user equipments and transmitted to the base station together by the one user equipment. The wireless communication apparatus according to an embodiment of the present disclosure may be configured to generate, based on measurement reports of a first user equipment and at least one other user equipment in proximity-based service direct communication with the first user equipment received from the first user equipment, a common handover command for the first user equipment and the at least one other user equipment.

Figure 6:
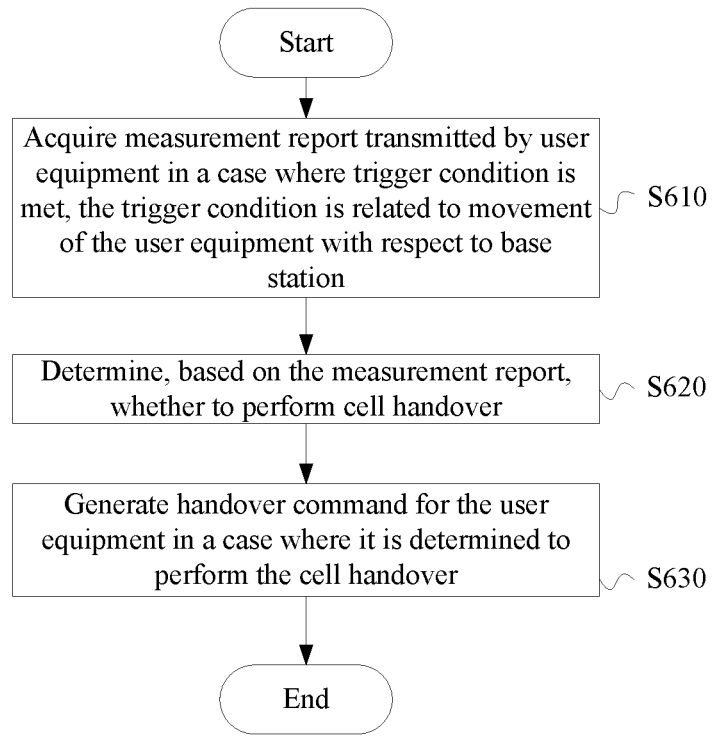
FIG. 6 is a flowchart showing a process example of a wireless communication method for base station side according to an embodiment of the present disclosure.
Figure 7:
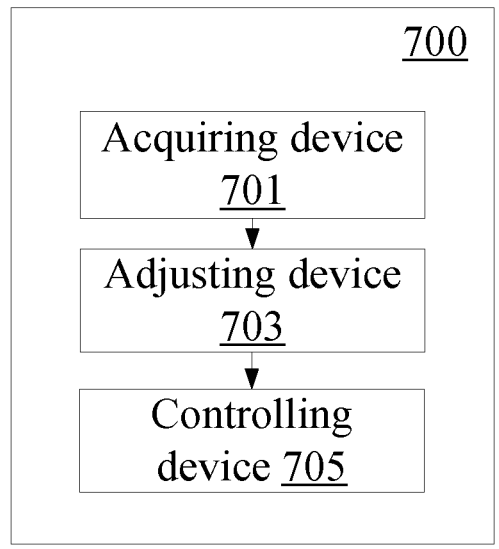
FIG. 7 is a block diagram showing a configuration example of a wireless communication apparatus for user equipment side according to an embodiment of the present disclosure.
Figure 8:
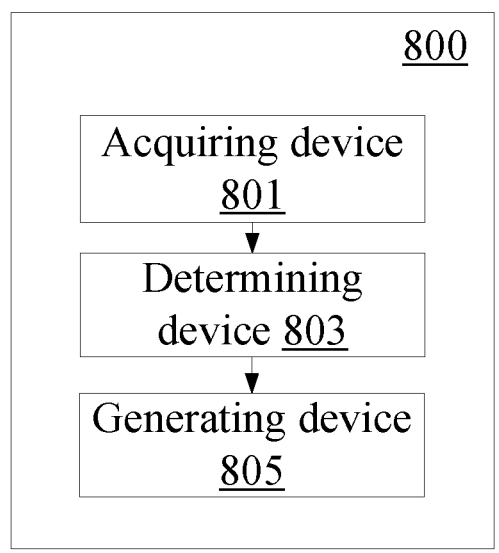
FIG. 8 is a block diagram showing a configuration example of a wireless communication apparatus for base station side according to an embodiment of the present disclosure.

Next, a wireless communication method for base station side according to an embodiment of the present disclosure is described with reference to FIG. 6.

In S610, a measurement report transmitted by a user equipment in a case where a trigger condition is met is acquired, where the trigger condition is related to a movement of the user equipment with respect to a base station.

Next, in S620, it is determined whether to perform cell handover based on the measurement report.

Next, in S630, a handover command for the user equipment is generated in a case where it is determined to perform the cell handover.

As an example, various steps of the methods above and various modules and/or units of the apparatuses above may be implemented as software, firmware, hardware or a combination thereof. In a case of implementing by software or firmware, programs consisting of the software for implementing the methods above are installed to a computer with a dedicated hardware structure (for example a general-purpose computer 900 shown in FIG. 9) from the storage medium or the network. The computer can perform various types of functions when installed with various types of programs.

Figure 9:
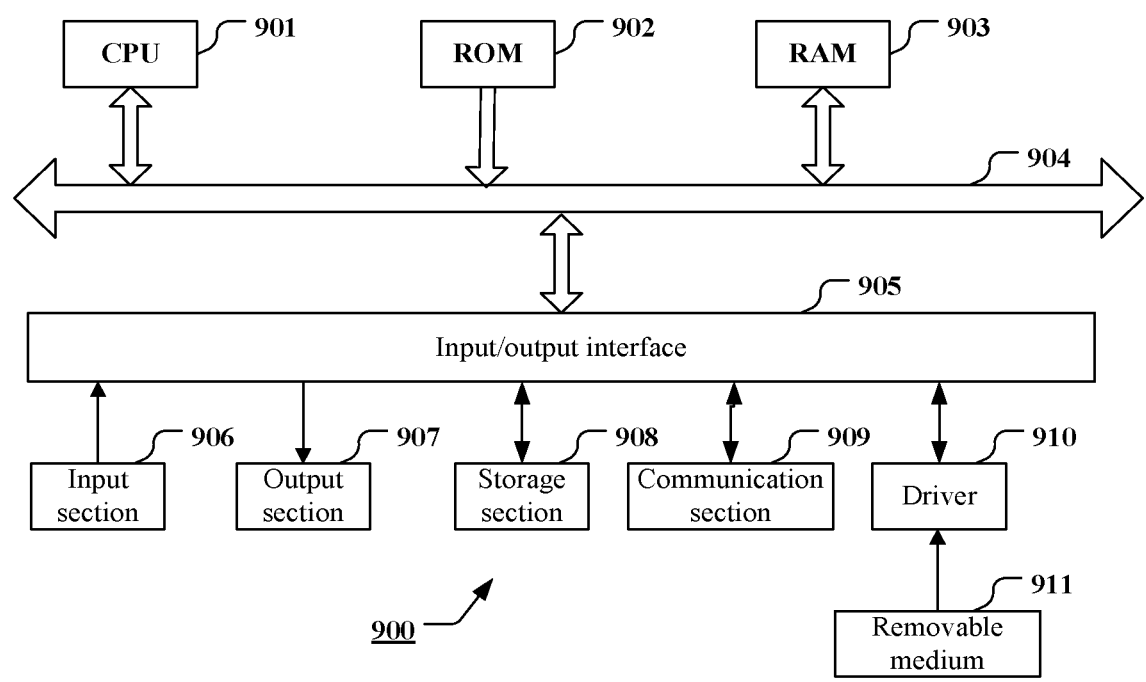
FIG. 9 is a block diagram showing an exemplary structure of a computer for implementing the method and apparatus according to the present disclosure.

In FIG. 9, a central processing unit (CPU) 901 performs various types of processing according to programs stored in a read only memory (ROM) 902 or programs loaded from a storage section 908 to a random access memory (RAM) 903. Data required when the CPU 901 performs various types of processing is also stored in the RAM 903 as needed. The CPU 901, the ROM 902 and the RAM 903 are linked to each other via a bus 904. An input/output interface 905 is also linked to the bus 904.

The following components are linked to the input/output interface 905: an input section 906 (including a keyboard, and a mouse and so on), an output section 907 (including a display, for example a cathode ray tube (CRT) and a liquid crystal display (LCD), and a loudspeaker), a storage section 908 (including a hard disk and so on), and a communication section 909 (including a network interface card for example a LAN card, and a modem). The communication section 909 performs communication processing via a network for example the Internet. A driver 910 may also be linked to the input/output interface 905 as needed. A removable medium 911 for example a magnetic disk, an optical disk, a magnetic-optical disk and a semiconductor memory may be installed on the driver 910 as needed, such that computer programs read from the removable medium 911 are installed on the storage section 908 as needed.

In a case of performing the series of processing described above by software, programs consisting of the software are installed from the network for example the Internet or the storage medium for example the removable medium 911.

Those skilled in the art should understand that the storage medium is not limited to the removable medium 911 shown in FIG. 9 which stores programs and is distributed separately from the device to provide the programs to the user. Examples of the removable medium 911 include: a magnetic disk (including a floppy disk (registered trademark), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be a hard disk included in the ROM 902 and the storage section 908 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is further provided according to the present disclosure. The storage medium includes but not limited to a floppy disk, an optical disk, a magnetic-optical disk, a storage card and a memory stick and so on.

The embodiments of the present disclosure further relate to an electronic device in the following. In a case that the electronic device is for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device); and one or more remote radio heads (RRH) located at positions different from the body. In addition, various types of terminals described in the following each may function as a base station to operate by performing functions of the base station temporarily or in a semi-permanent manner.

In a case that the electronic device is for user equipment side, the electronic device may be implemented as mobile terminals (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

Application Example of a Terminal Device

Figure 10:
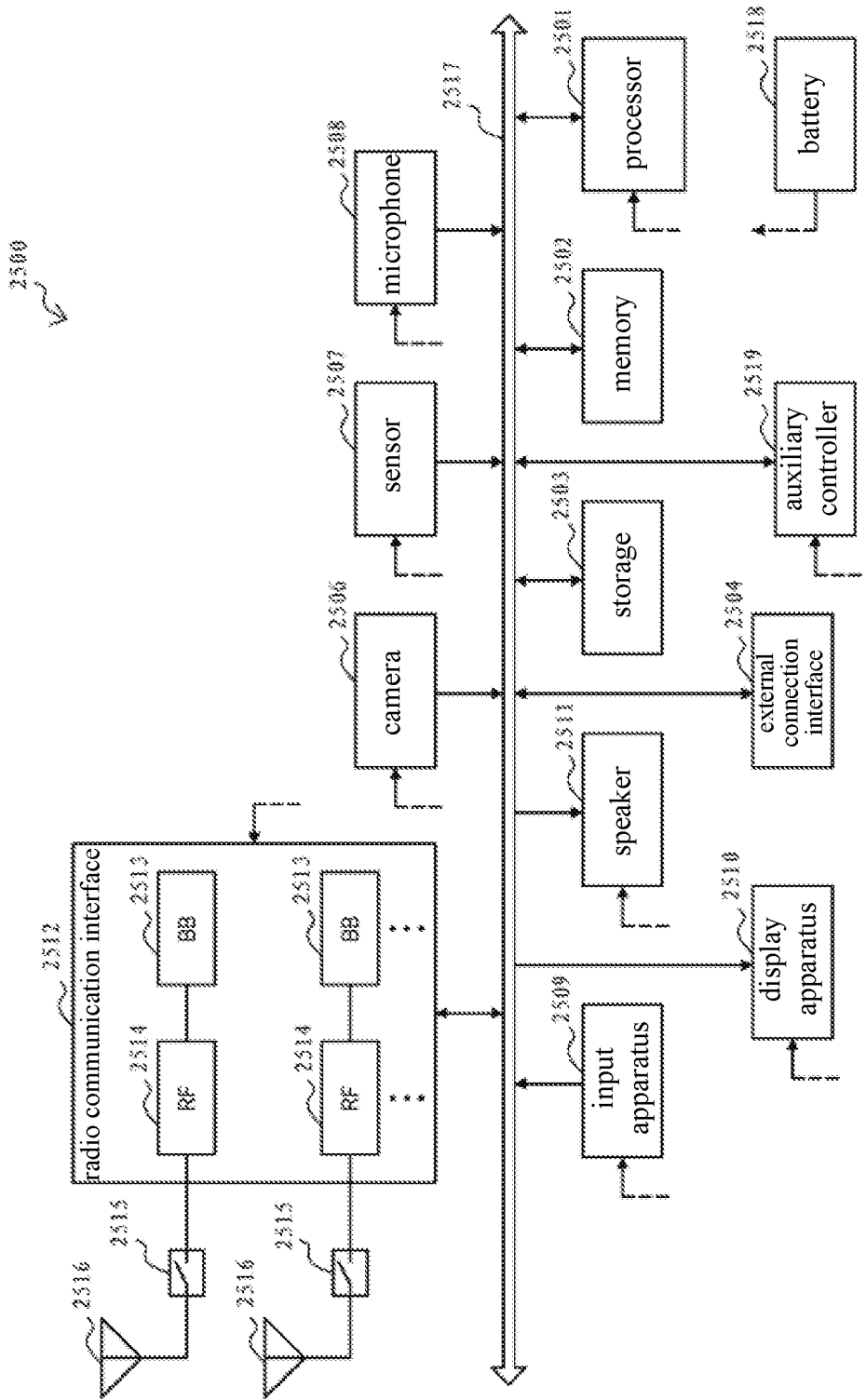
FIG. 10 is a block diagram showing an example of a schematic configuration of a smart phone to which the technology according to the present disclosure may be applied.

FIG. 10 is a block diagram showing an example of a schematic configuration of a smart phone 2500 to which the technology according to the present disclosure may be applied. The smart phone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smart phone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external apparatus such as a memory card and a universal serial bus (USB) apparatus to the smart phone 2500.

The camera 2506 includes an image sensor such as a charge coupled device (CCD) and a complementary metal oxide semiconductor (CMOS), and generates a captured image. The sensor 2507 may include a group of sensors such as a measurement sensor, a gyro sensor, a geomagnetic sensor, and an acceleration sensor. The microphone 2508 converts sounds that are inputted to the smart phone 2500 into audio signals. The input apparatus 2509 includes, for example, a touch sensor configured to detect touch onto a screen of the display apparatus 2510, a keypad, a keyboard, a button, or a switch, and receive an operation or information inputted from a user. The display apparatus 2510 includes a screen such as a liquid crystal display (LCD) and an organic light-emitting diode (OLED) display, and displays an output image of the smart phone 2500. The speaker 2511 converts audio signals that are outputted from the smart phone 2500 into sounds.

The radio communication interface 2512 supports any cellular communication scheme such as LTE and LTE-Advanced, and performs radio communication. The radio communication interface 2512 may typically include, for example, a base band (BB) processor 2513 and a radio frequency (RF) circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a chip module having the BB processor 2513 and the RF circuit 2514 integrated thereon. The radio communication interface 2512 may include multiple BB processors 2513 and multiple RF circuits 2514, as illustrated in FIG. 10. Although FIG. 10 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance radio communication scheme, a near field communication scheme, and a radio local area network (LAN) scheme. In this case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Figure 13:
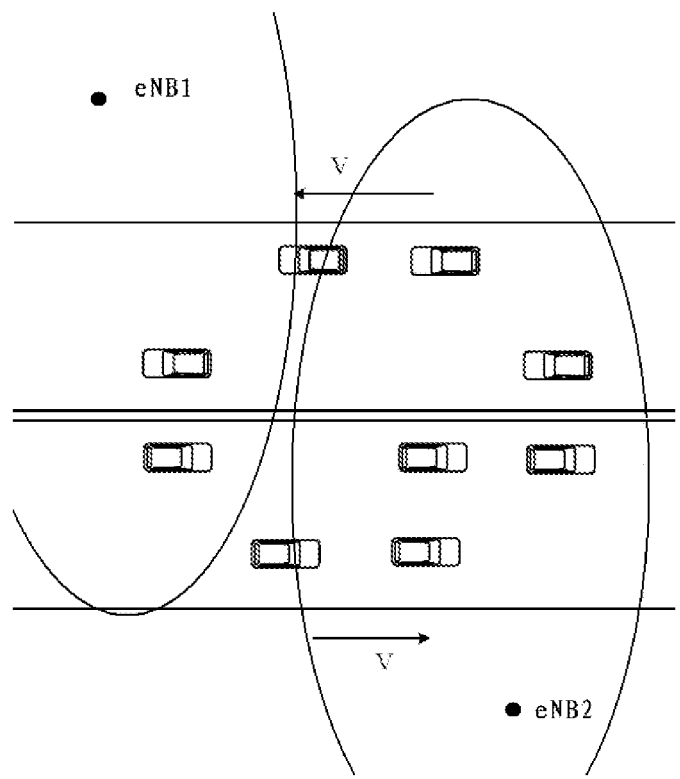
FIG. 13 is a schematic diagram showing a V2V application scenario to which the embodiment of the present disclosure may be applied.

Each of the antennas 2516 includes a single or multiple antenna elements (such as multiple antenna elements included in an MIMO antenna), and is used for the radio communication interface 2512 to transmit and receive radio signals. The smart phone 2500 may include the multiple antennas 2516, as illustrated in FIG. 10. Although FIG. 13 illustrates the example in which the smart phone 2500 includes the multiple antennas 2516, the smart phone 2500 may also include a single antenna 2516.

Furthermore, the smart phone 2500 may include the antenna 2516 for each radio communication scheme. In this case, the antenna switches 2515 may be omitted from the configuration of the smart phone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smart phone 2500 illustrated in FIG. 13 via feeder lines, which are partially shown as dashed lines in the figure. The auxiliary controller 2519 operates a minimum necessary function of the smart phone 2500, for example, in a sleep mode.

In the smart phone 2500 shown in FIG. 10, the transceiving device 220 described with reference to FIG. 2 may be implemented by the radio communication interface 2512. At least a part of functions of the units described with reference to FIG. 1 and FIG. 2 may be implemented by the processor 2501 or the auxiliary controller 2519. For example, power consumption of the battery 2518 may be reduced by performing a part of the functions of the processor 2501 by the auxiliary controller 2519. In addition, the processor 2501 or the auxiliary controller 2519 may perform at least a part of the functions of the units described with reference to FIG. 1 and FIG. 2 by executing programs stored in the memory 2502 or the storage 2503.

Application Example of a Base Station

Figure 11:
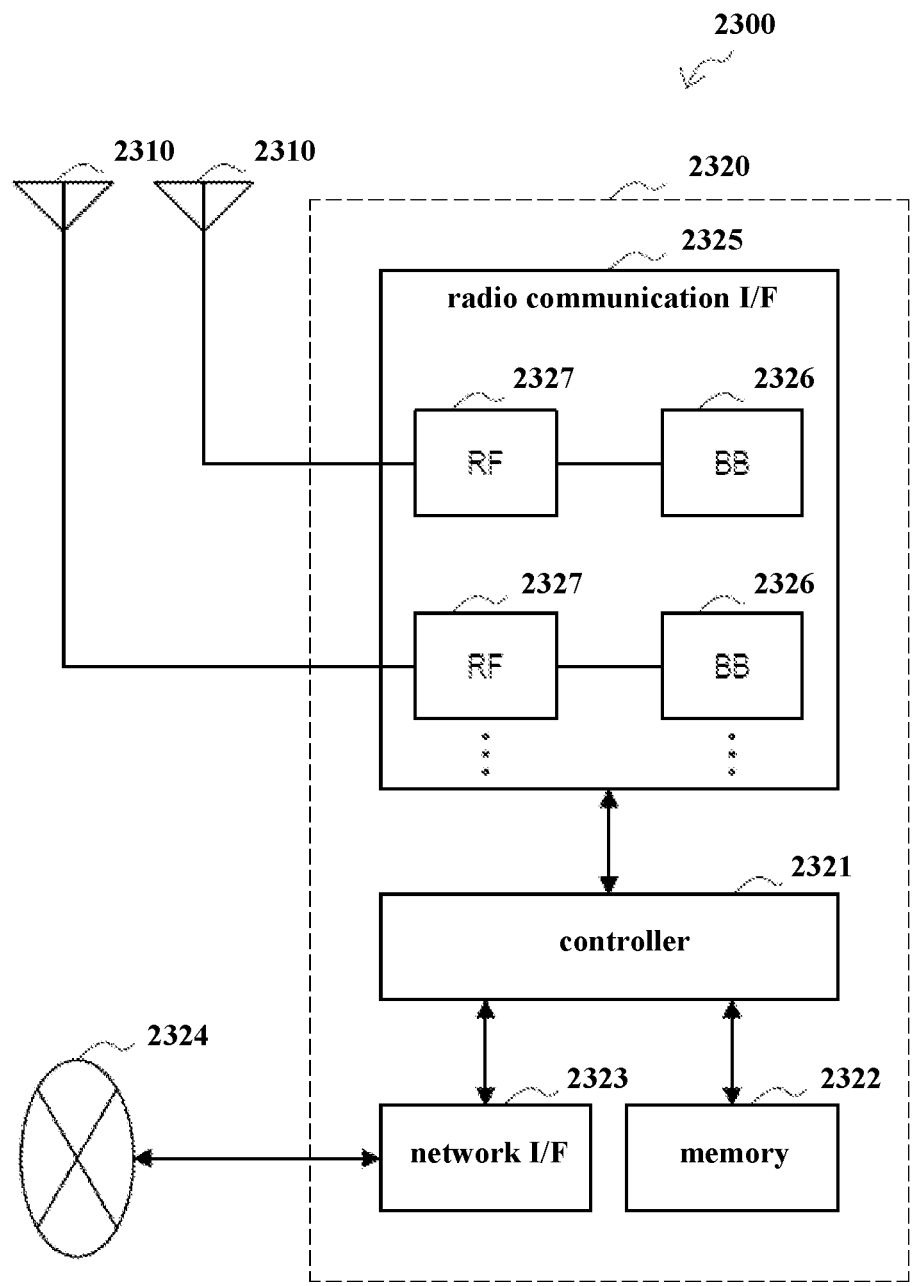
FIG. 11 is a block diagram showing an example of a schematic configuration of an eNB (evolved Node B) to which the technology according to the present disclosure may be applied.

FIG. 11 is a block diagram showing an example of a schematic configuration of an eNB to which the technology according to the present disclosure may be applied. An eNB 2300 includes one or more antennas 2310 and a base station device 2320. The base station device 2320 and each antenna 2310 may be connected to each other via a radio frequency (RF) cable.

Each of the antennas 2310 includes one or more antenna elements (such as multiple antenna elements included in a multiple input multiple output (MIMO) antenna) and is used by the base station device 2320 to transmit and receive a radio signal. As shown in FIG. 11, the eNB 2300 may include multiple antennas 2310. For example, the multiple antennas 2310 may be compatible with multiple frequency bands used by the eNB 2300. Although FIG. 11 shows an example in which the eNB 2300 includes multiple antennas 2310, the eNB 2300 may include a single antenna 2310.

The base station device 2320 includes a controller 2321, a memory 2322, a network interface 2323 and a radio communication interface 2325.

The controller 2321 may be a CPU or a DSP and control various functions of higher layers of the base station device 2320. For example, the controller 2321 generates a data packet based on data in a signal processed by the radio communication interface 2325, and transfers the generated packet via a network interface 2323. The controller 2321 may bind data from multiple baseband processors to generate a binding packet and transfer the generated binding packet. The controller 2321 may have logic functions for performing the following control: radio resource control, radio carrying control, mobility management, admission control and schedule. The control may be performed in combination with an adjacent eNB or a core network node. The memory 2322 includes RAM and ROM, and stores programs executed by the controller 2321 and various types of control data (such as a terminal list, transmission power data and scheduling data).

The network interface 2323 is configured to connect the base station device 2320 to a communication interface of the core network 2324. The controller 2321 may communication with the core network node or another eNB via the network interface 2323. In this case, the eNB 2300 and the core network node or another eNB may be connected to each other via a logic interface (such as an S1 interface and an X2 interface). The network interface 2323 may be a wired communication interface or a radio communication interface for a wireless backhaul line. If the network interface 2323 is a radio communication interface, the network interface 2323 may use a higher frequency band for wireless communication as compared with the frequency band used by the radio communication interface 2325.

The radio communication interface 2325 supports any cellular communication scheme (such as long term evolution (LTE) and LTE-advanced), and provides a radio connection to a terminal located in a cell of the eNB 2300 via an antenna 2310. The radio communication interface 2325 may generally include a BB processor 2326 and an RF circuit 2327. The BB processor 2326 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2321, the BB processor 2326 may have a part or all of the above logic functions. The BB processor 2326 may be a memory storing communication control programs or a module including a processor configured to execute programs and a related circuit. Updating programs may change functions of the BB processor 2326. The module may be a card or a blade inserted into a slot of the base station device 2320. Alternatively, the module may be a chip installed on the card or the blade. The RF circuit 2327 may include for example a mixer, a filter or an amplifier, and transmits and receives a radio signal via the antenna 2310.

As shown in FIG. 11, the radio communication interface 2325 may include multiple BB processors 2326. For example, the multiple BB processors 2326 may be compatible with multiple frequency bands used by the eNB 2300. As shown in FIG. 11, the radio communication interface 2325 may include multiple RF circuits 2327. For example, the multiple RF circuits 2327 may be compatible with multiple antenna elements. Although FIG. 11 shows an example in which the radio communication interface 2325 includes multiple BB processors 2326 and multiple RF circuits 2327, the radio communication interface 2325 may include a single BB processor 2326 or a single RF circuit 2327.

In the eNB 2300 shown in FIG. 11, the transceiving device 520 described with reference to FIG. 5 may be implemented by the radio communication interface 2325. At least a part of the functions of the units described with reference to FIG. 4 and FIG. 5 may be implemented by the controller 2321. For example, the controller 2321 may perform at least a part of the functions of the units described with reference to FIG. 4 and FIG. 5 by performing the programs stored in the memory 2322.

Application Example of a Car Navigation Device

Figure 12:
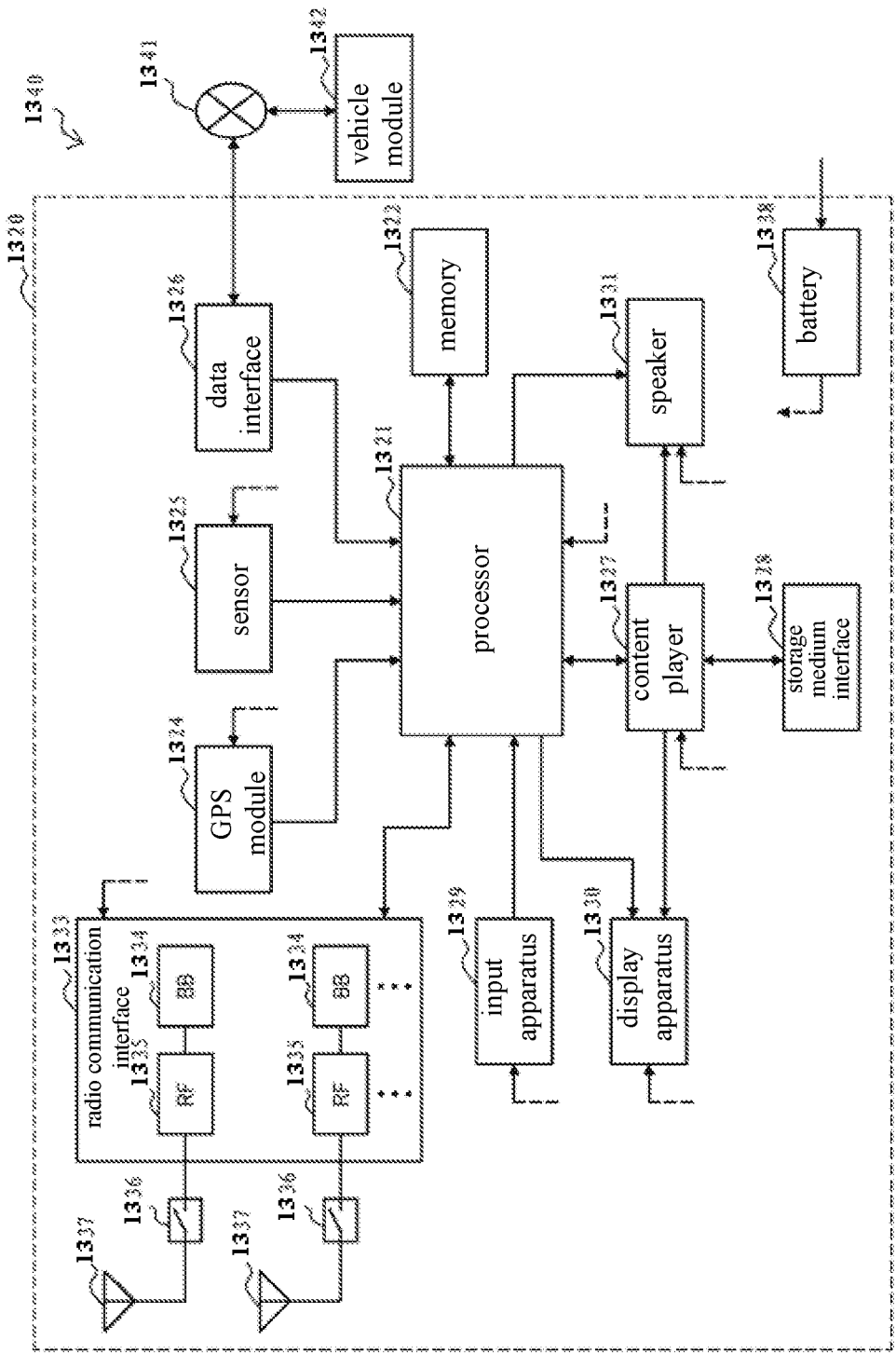
FIG. 12 is a block diagram showing an example of a schematic configuration of a car navigation device to which the technology according to the present disclosure may be applied.

FIG. 12 is a block diagram showing an example of a schematic configuration of a car navigation device 1320 to which the technology according to the present disclosure may be applied. The car navigation device 1320 includes a processor 1321, a memory 1322, a global positioning system (GPS) module 1324, a sensor 1325, a data interface 1326, a content player 1327, a storage medium interface 1328, an input apparatus 1329, a display apparatus 1330, a speaker 1331, a radio communication interface 1333, one or more antenna switches 1336, one or more antennas 1337, and a battery 1338.

The processor 1321 may be, for example, a CPU or a SoC, and controls a navigation function and another function of the car navigation device 1320. The memory 1322 includes RAM and ROM, and stores a program that is executed by the processor 1321, and data.

The GPS module 1324 uses GPS signals received from a GPS satellite to measure a position (such as latitude, longitude, and altitude) of the car navigation device 1320. The sensor 1325 may include a group of sensors such as a gyro sensor, a geomagnetic sensor, and an air pressure sensor. The data interface 1326 is connected to, for example, an in-vehicle network 1341 via a terminal that is not shown, and acquires data generated by the vehicle, such as vehicle speed data.

The content player 1327 reproduces content stored in a storage medium (such as a CD and a DVD) that is inserted into the storage medium interface 1328. The input apparatus 1329 includes, for example, a touch sensor configured to detect touch on a screen of the display apparatus 1330, a button, or a switch, and receives an operation or information inputted from a user. The display apparatus 1330 includes a screen such as a LCD or an OLED display, and displays an image of the navigation function or content that is reproduced. The speaker 1331 outputs sounds of the navigation function or the content that is reproduced.

The radio communication interface 1333 supports any cellular communication scheme (such as LTE and LTE-Advanced), and performs wireless communication. The radio communication interface 1333 may typically include, for example, a BB processor 1334 and an RF circuit 1335. The BB processor 1334 may perform, for example, encoding/decoding, modulating/demodulating, and multiplexing/demultiplexing, and performs various types of signal processing for wireless communication. Meanwhile, the RF circuit 1335 may include, for example, a mixer, a filter, and an amplifier, and transmits and receives radio signals via the antenna 1337. The radio communication interface 1333 may also be one chip module that has the BB processor 1334 and the RF circuit 1335 integrated thereon. The radio communication interface 1333 may include multiple BB processors 1334 and multiple RF circuits 1335, as illustrated in FIG. 12. Although FIG. 12 illustrates the example in which the radio communication interface 1333 includes the multiple BB processors 1334 and the multiple RF circuits 1335, the radio communication interface 1333 may also include a single BB processor 1334 or a single RF circuit 1335.

Furthermore, in addition to a cellular communication scheme, the radio communication interface 1333 may support another type of wireless communication scheme such as a short-distance wireless communication scheme, a near field communication scheme, and a wireless LAN scheme. In that case, the radio communication interface 1333 may include the BB processor 1334 and the RF circuit 1335 for each wireless communication scheme.

Each of the antenna switches 1336 switches connection destinations of the antennas 1337 among multiple circuits (such as circuits for different wireless communication schemes) included in the radio communication interface 1333.

Each of the antennas 1337 includes a single or multiple antenna elements (such as multiple antenna elements included in an MIMO antenna), and is used for the radio communication interface 1333 to transmit and receive radio signals. The car navigation device 1320 may include multiple antennas 1337, as illustrated in FIG. 12. Although FIG. 13 illustrates the example in which the car navigation device 1320 includes the multiple antennas 1337, the car navigation device 1320 may also include a single antenna 1337.

Furthermore, the car navigation device 1320 may include the antenna 1337 for each wireless communication scheme. In that case, the antenna switches 1336 may be omitted from the configuration of the car navigation device 1320.

The battery 1338 supplies power to blocks of the car navigation device 1320 illustrated in FIG. 12 via feeder lines that are partially shown as dashed lines in the drawing. The battery 1338 accumulates power supplied form the vehicle.

In the car navigation device 1320 illustrated in FIG. 12, the transceiving device 220 described with reference to FIG. 2 may be implemented by the radio communication interface 1333. The processor 1321 may perform at least a part of the functions of the units described with reference to FIG. 1 and FIG. 2 by executing programs stored in the memory 1322.

The technology of the present disclosure may also be realized as an in-vehicle system (or a vehicle) 1340 including one or more blocks of the car navigation device 1320, the in-vehicle network 1341, and a vehicle module 1342. The vehicle module 1342 generates vehicle data (such as vehicle speed, engine speed, and fault information), and outputs the generated data to the in-vehicle network 1341.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. A wireless communication apparatus for user equipment side, comprising:
at least one processor configured to
acquire information regarding a movement of the wireless communication apparatus with respect to a serving base station thereof;
adjust, based on the information, a trigger condition for a transmission of a measurement report for performing a cell handover;
control, based on the adjusted trigger condition, the transmission of the measurement report,
wherein the information regarding the movement is based on a movement direction of the wireless communication apparatus and a radial direction of the wireless communication apparatus with respect to the serving base station;
making an entry condition of entering into a trigger event at least include that the wireless communication apparatus moves away from the serving base station; and
exiting from the trigger event in a case where the wireless communication apparatus moves towards the serving base station.

2. The wireless communication apparatus according to claim 1, wherein the trigger condition comprises a length of time-to-trigger for triggering the transmission of the measurement report, and adjusting the trigger condition comprises:
shortening the time-to-trigger in a case where the information indicates that the wireless communication apparatus moves away from the serving base station.

3. The wireless communication apparatus according to claim 2, wherein controlling the transmission of the measurement report according to the adjusted trigger condition comprises:
transmitting the measurement report in a case where a difference between a reference signal received power of the serving base station and a reference signal received power of a target base station for performing the cell handover is continuously greater than a predetermined threshold during the adjusted time-to-trigger.

4. The wireless communication apparatus according to claim 2, wherein adjusting the trigger condition comprises:
adjusting the length of the time-to-trigger further based on a movement velocity of the wireless communication apparatus.

5. The wireless communication apparatus according to claim 1,
wherein the information regarding the movement comprises an angle between the movement direction of the wireless communication apparatus and the radial direction of the wireless communication apparatus with respect to the serving base station, and
wherein adjusting the trigger condition comprises:
shortening the length of time-to-trigger for triggering the transmission of the measurement report with decrement of an absolute value of the angle, in a case where the absolute value of the angle is less than a predetermined angle threshold, wherein the predetermined angle threshold is greater than 0° and less than or equal to 90°.

6. The wireless communication apparatus according to claim 1, wherein acquiring the information regarding the movement comprises:
determining the radial direction based on position information of the serving base station and position information of the wireless communication apparatus.

7. The wireless communication apparatus according to claim 1, further comprising:
a transceiving device configured to
transmit the measurement report to another wireless communication apparatus in proximity-based service direct communication with the wireless communication apparatus.

8. The wireless communication apparatus according to claim 1, further comprising:
a transceiving device configured to
receive, from one or more other wireless communication apparatuses in proximity-based service direct communication with the wireless communication apparatus, measurement reports for performing a cell handover.

9. The wireless communication apparatus according to claim 8, wherein the transceiving device is further configured to:
transmit the measurement reports received from the other wireless communication apparatuses during a predetermined time period together with the measurement report of the wireless communication apparatus to the serving base station.

10. The wireless communication apparatus according to claim 1, wherein the processor is further configured to:
acquire information regarding a distance and/or a relative speed between the wireless communication apparatus and another wireless communication apparatus in proximity-based service direct communication with the wireless communication apparatus; and
further adjust the trigger condition based on the distance and/or the relative speed between the wireless communication apparatus and the other wireless communication apparatus.

11. The wireless communication apparatus according to claim 10, wherein further adjusting the trigger condition based on the distance between the wireless communication apparatus and the other wireless communication apparatus comprises:
reducing a time-to-trigger and/or a handover margin for triggering the transmission of the measurement report with increment of the distance between the wireless communication apparatus and the other wireless communication apparatus.

12. A wireless communication method for user equipment side, comprising:

acquiring information regarding a movement of a wireless communication apparatus with respect to a serving base station thereof;

adjusting, based on the information, a trigger condition for a measurement report for performing cell handover;

controlling, based on the adjusted trigger condition, a transmission of the measurement report, wherein the information regarding the movement is based on a movement direction of the wireless communication apparatus and a radial direction of the wireless communication apparatus with respect to the serving base station;

making an entry condition of entering into a trigger event at least include that the wireless communication apparatus moves away from the serving base station; and exiting from the trigger event in a case where the wireless communication apparatus moves towards the serving base station.

13. A wireless communication apparatus for base station side, comprising:

at least one processor configured to acquire a measurement report which is transmitted by a user equipment in a case where a trigger condition is met, wherein the trigger condition is related to a movement of the user equipment with respect to the base station;

determine, based on the measurement report, whether to perform a cell handover;

generate a handover command for the user equipment in a case where it is determined to perform the cell handover, wherein the trigger condition is related to a movement direction of the user equipment and a radial direction of the user equipment with respect to the base station;

making an entry condition of entering into a trigger event at least include that the wireless communication apparatus moves away from the base station; and exiting from the trigger event in a case where the wireless communication apparatus moves towards the base station.

14. The wireless communication apparatus according to claim 13, further comprising:

a transceiving device configured to transmit position information of the base station to the user equipment.

15. The wireless communication apparatus according to claim 13, wherein the processor is further configured to:

generate, based on measurement reports of a first user equipment and at least one other user equipment in proximity-based service direct communication with the first user equipment received from the first user equipment, a common handover command for the first user equipment and the at least one other user equipment.

16. The wireless communication apparatus according to claim 15, wherein generating the common handover command comprises:

embedding, in the common handover command, cell radio network temporary identifications and random access preamble sequences for the first user equipment and a second user equipment from a common handover target base station of the first user equipment and the second user equipment, wherein the processor is further configured to perform control to transmit the common handover command to the first user equipment.

17. The wireless communication apparatus according to claim 1, wherein the processor is further configured to:

acquire information regarding a distance between the wireless communication apparatus and another wireless communication apparatus in proximity-based service direct communication with the wireless communication apparatus; and further adjust the trigger condition based on the distance between the wireless communication apparatus and the other wireless communication apparatus.

18. The wireless communication apparatus according to claim 1, wherein the processor is further configured to:

acquire information regarding a distance and a relative speed between the wireless communication apparatus and another wireless communication apparatus in proximity-based service direct communication with the wireless communication apparatus; and further adjust the trigger condition based on the distance and the relative speed between the wireless communication apparatus and the other wireless communication apparatus.

19. The wireless communication apparatus according to claim 1, wherein the processor is further configured to:

acquire information regarding a distance between the wireless communication apparatus and another wireless communication apparatus in proximity-based service direct communication with the wireless communication apparatus; and further adjust the trigger condition based on the distance between the wireless communication apparatus and the other wireless communication apparatus.

20. The wireless communication apparatus according to claim 1, wherein the processor is further configured to:

control, based on the information, to enter into and/or exit from the trigger event for the measurement report.

* * * * *